United States Patent
Conley

(10) Patent No.: US 11,435,028 B2
(45) Date of Patent: Sep. 6, 2022

(54) LUBRICANT INJECTOR

(71) Applicant: Lincoln Industrial Corporation, St. Louis, MO (US)

(72) Inventor: Paul G Conley, St. Charles, MO (US)

(73) Assignee: Lincoln Industrial Corporation, Saint Louis, MO (US)

( * ) Notice: Subject to any disclaimer, the term of this patent is extended or adjusted under 35 U.S.C. 154(b) by 797 days.

(21) Appl. No.: 16/399,308

(22) Filed: Apr. 30, 2019

(65) Prior Publication Data

US 2020/0347989 A1    Nov. 5, 2020

(51) Int. Cl.
| | |
|---|---|
| *F16N 13/16* | (2006.01) |
| *F16N 25/02* | (2006.01) |
| *F16N 7/40* | (2006.01) |

(52) U.S. Cl.
CPC .............. *F16N 13/16* (2013.01); *F16N 7/40* (2013.01); *F16N 25/02* (2013.01)

(58) Field of Classification Search
CPC ............. F16N 13/16; F16N 25/02; F16N 7/40
See application file for complete search history.

(56) References Cited

U.S. PATENT DOCUMENTS

| | | |
|---|---|---|
| 1,640,842 A | 8/1927 | Loomis |
| 1,946,546 A | 2/1934 | Pritchard |
| 2,005,166 A | 6/1935 | Roberts |
| 2,105,577 A | 1/1938 | Acker |
| 2,122,177 A | 6/1938 | Klein |
| 2,141,022 A | 12/1938 | Rotter |
| 2,155,250 A | 4/1939 | Barks |
| 2,162,898 A | 6/1939 | Rotter |
| 2,206,335 A | 7/1940 | Rotter et al. |
| 2,283,638 A | 5/1942 | Klein et al. |
| 2,292,294 A | 8/1942 | Rotter et al. |
| 2,328,812 A | 9/1943 | Klein |
| 2,358,719 A | 9/1944 | Klein |
| 2,448,583 A | 9/1948 | Fox |

(Continued)

FOREIGN PATENT DOCUMENTS

| | | |
|---|---|---|
| EP | 0 098 819 A1 | 1/1984 |
| GB | 2 205 905 A | 12/1988 |

(Continued)

*Primary Examiner* — Michael R Mansen
*Assistant Examiner* — Mark K Buse
(74) *Attorney, Agent, or Firm* — Stinson LLP

(57) ABSTRACT

A lubricant injector includes an injector body having an inlet port fluidly coupleable with a lubricant supply, an outlet port fluidly coupleable with a lubrication point, a piston chamber and a valve chamber. A piston is disposed within the piston chamber and defines a measuring section and an actuating section, the piston being linearly displaceable along an axis through the piston chamber so as to inversely vary the volume of the chamber measuring section and the volume of the chamber actuating section. A valve member disposed within the valve chamber is displaceable along an axis through the valve chamber between a first position, at which the inlet port is fluidly coupled with the piston chamber actuating and measuring sections, and a second position at which the inlet port is fluidly coupled with the piston chamber actuating section and the outlet port is fluidly coupled with the piston chamber measuring section.

18 Claims, 14 Drawing Sheets

(56) References Cited

U.S. PATENT DOCUMENTS

| | | | |
|---|---|---|---|
| 2,627,320 A | 2/1953 | Rotter | |
| 2,637,413 A | 5/1953 | Fox et al. | |
| 2,667,236 A | 1/1954 | Graves | |
| 2,684,732 A | 7/1954 | Harter | |
| 2,699,842 A * | 1/1955 | Juettner | F16N 27/00 |
| | | | 184/7.4 |
| 2,719,603 A | 10/1955 | Le Clair | |
| 2,766,847 A * | 10/1956 | Harter | F16N 25/02 |
| | | | 91/308 |
| 2,867,481 A | 1/1959 | Hornbostel | |
| 2,905,270 A | 9/1959 | Jackson | |
| 2,996,147 A | 8/1961 | Callahan | |
| 3,013,633 A | 12/1961 | Rotter | |
| 3,025,559 A | 3/1962 | Basinger | |
| 3,171,510 A | 3/1965 | Olsen et al. | |
| 3,220,375 A | 11/1965 | Gruber et al. | |
| 3,507,359 A | 4/1970 | Warnock | |
| 3,543,881 A | 12/1970 | Obergefell | |
| 3,559,765 A | 2/1971 | Smith | |
| 3,609,066 A | 9/1971 | Wegmann | |
| 3,715,013 A | 2/1973 | Lyth et al. | |
| 3,722,967 A | 3/1973 | Lewis | |
| 3,951,448 A | 4/1976 | Hawie | |
| 3,958,725 A | 5/1976 | Reeve | |
| 3,995,717 A | 12/1976 | Kroffke | |
| 4,027,744 A | 6/1977 | Kuhnelt et al. | |
| 4,105,094 A * | 8/1978 | Callahan | F16N 25/02 |
| | | | 184/7.4 |
| 4,494,913 A | 1/1985 | Keller | |
| 4,520,902 A | 6/1985 | Snow | |
| 4,572,331 A | 2/1986 | Powell et al. | |
| 4,691,618 A * | 9/1987 | Poling | F15B 13/04 |
| | | | 137/625.69 |
| 4,759,427 A | 7/1988 | Onose et al. | |
| 4,893,697 A * | 1/1990 | Tosi | F16N 13/16 |
| | | | 184/29 |
| 5,038,892 A | 8/1991 | Maloney | |
| 5,126,722 A | 6/1992 | Kamis | |
| 5,147,016 A * | 9/1992 | Antila | F16N 25/02 |
| | | | 184/7.4 |
| 5,293,959 A | 3/1994 | Kimberlin | |
| 5,626,467 A | 5/1997 | Cantley | |
| 5,772,085 A | 6/1998 | Bryant et al. | |
| 6,142,393 A | 11/2000 | Kotyk | |
| 6,244,387 B1 | 6/2001 | Paluncic et al. | |
| 6,322,336 B1 | 11/2001 | Huss | |
| 6,705,432 B2 | 3/2004 | Conley et al. | |
| 6,863,157 B2 | 3/2005 | Conley et al. | |
| 8,206,135 B2 | 6/2012 | Wang | |
| 9,243,749 B2 | 1/2016 | Clark | |
| 9,388,941 B2 | 7/2016 | Arens et al. | |
| 10,744,989 B2 | 9/2020 | Edler et al. | |
| 10,767,813 B2 | 9/2020 | Edler et al. | |
| 11,149,792 B2 * | 10/2021 | Kreutzkaemper | F16C 43/04 |
| 2002/0144865 A1 * | 10/2002 | Clancy | F16N 7/32 |
| | | | 184/55.1 |
| 2002/0157901 A1 | 10/2002 | Kast et al. | |
| 2003/0039561 A1 | 2/2003 | Batten et al. | |
| 2003/0089553 A1 * | 5/2003 | Conley | F16N 27/00 |
| | | | 184/7.4 |
| 2005/0180870 A1 | 8/2005 | Stanley et al. | |
| 2006/0213725 A1 * | 9/2006 | Czempisz | F16N 25/02 |
| | | | 184/7.4 |
| 2007/0177835 A1 | 8/2007 | Verhaegen | |
| 2009/0148088 A1 | 6/2009 | Sasabe et al. | |
| 2010/0038178 A1 | 2/2010 | Paluncic et al. | |
| 2010/0206667 A1 | 8/2010 | Paluncic et al. | |
| 2013/0092475 A1 | 4/2013 | Arens et al. | |
| 2017/0074323 A1 * | 3/2017 | Kreutzkaemper | F16C 33/4647 |
| 2018/0149310 A1 | 5/2018 | Radzyuk | |
| 2018/0149461 A1 * | 5/2018 | Hess | G01B 11/14 |
| 2019/0195423 A1 | 6/2019 | Edler et al. | |
| 2019/0195424 A1 | 6/2019 | Edler et al. | |

FOREIGN PATENT DOCUMENTS

| | | |
|---|---|---|
| JP | H0280815 A | 3/1990 |
| JP | H02195020 A | 8/1990 |
| WO | 2004/113784 A1 | 12/2004 |

* cited by examiner

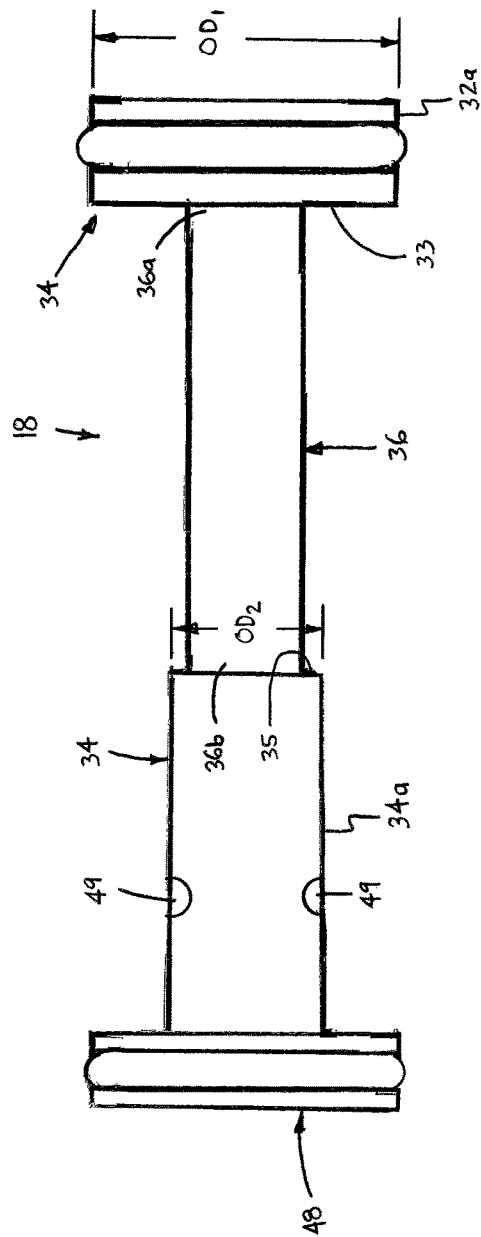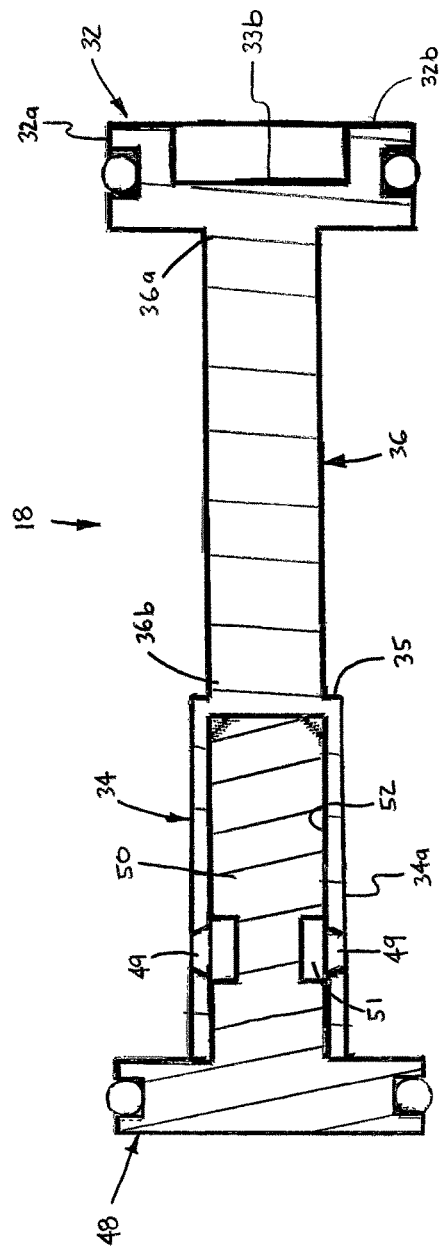

LUBRICANT INJECTOR

BACKGROUND OF THE INVENTION

The present invention relates to lubrication systems, and more particularly to lubricant injectors used in lubrication systems.

Lubricant injectors are known and typically include a body connectable to source of lubricant and an outlet connected to a point of delivery of lubricant, such as for example, a bearing. A piston is disposed within the body and functions to draw lubricant into the body and then dispense the lubricant through the outlet. Various passages and one or more valves within the injector body direct lubricant flow in a desired manner through the body.

SUMMARY OF THE INVENTION

In one aspect, the present invention is a lubricant injector comprising an injector body having an inlet port fluidly coupleable with a lubricant supply, an outlet port fluidly coupleable with a lubrication point, a piston chamber and a valve chamber. A piston is disposed within the piston chamber so as to define a measuring section and an actuating section. The piston is linearly displaceable along an axis extending through the piston chamber so as to inversely vary the volume of the chamber measuring section and the volume of the chamber actuating section. Further, a valve member disposed within the valve chamber and linearly displaceable along an axis extending through the valve chamber between a first position, at which the inlet port is fluidly coupled with the piston chamber actuating section and with the piston chamber measuring section, and a second position at which the inlet port is fluidly coupled with the piston chamber actuating section and the outlet port is fluidly coupled with the piston chamber measuring section.

In another aspect, the present invention is again a lubricant injector as described in the preceding paragraph and in which the valve chamber has a first section with a first diameter and a second section with a second diameter, the first diameter being greater than the second diameter. Also, the valve member includes a first cylindrical head disposed in the valve chamber first section and having an inner radial pressure surface, a second cylindrical head disposed within the valve chamber second section and having an inner radial pressure surface facing the first head pressure surface, and a rod having a first end connected with the first head and an opposing second end connected with the second head. The first head has a diameter greater than a diameter of the second head and the injector inlet is fluidly coupled with the valve chamber at a location between the first head and the second head. As such, fluid pressure of lubricant within the valve chamber between the first head and the second head is exerted on both the first head pressure surface and the second head pressure surface.

In a further aspect, the present invention is again a lubricant injector as described in the first paragraph above and in which the injector body includes an actuation passage extending between the valve chamber and the piston chamber actuating section. At least a portion of the actuation passage is provided by a tube extending into the piston chamber and disposed within a hole through the piston such that the piston slides about the tube when displacing within the piston chamber.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 6 is a side view of the valve member;

FIG. 7 is an axial cross-sectional view of the valve member;

FIG. 12, are each a broken-away, axial cross-sectional view of the injector depicting a different stage in the injector operation cycle.

DETAILED DESCRIPTION OF THE INVENTION

Figure 1:
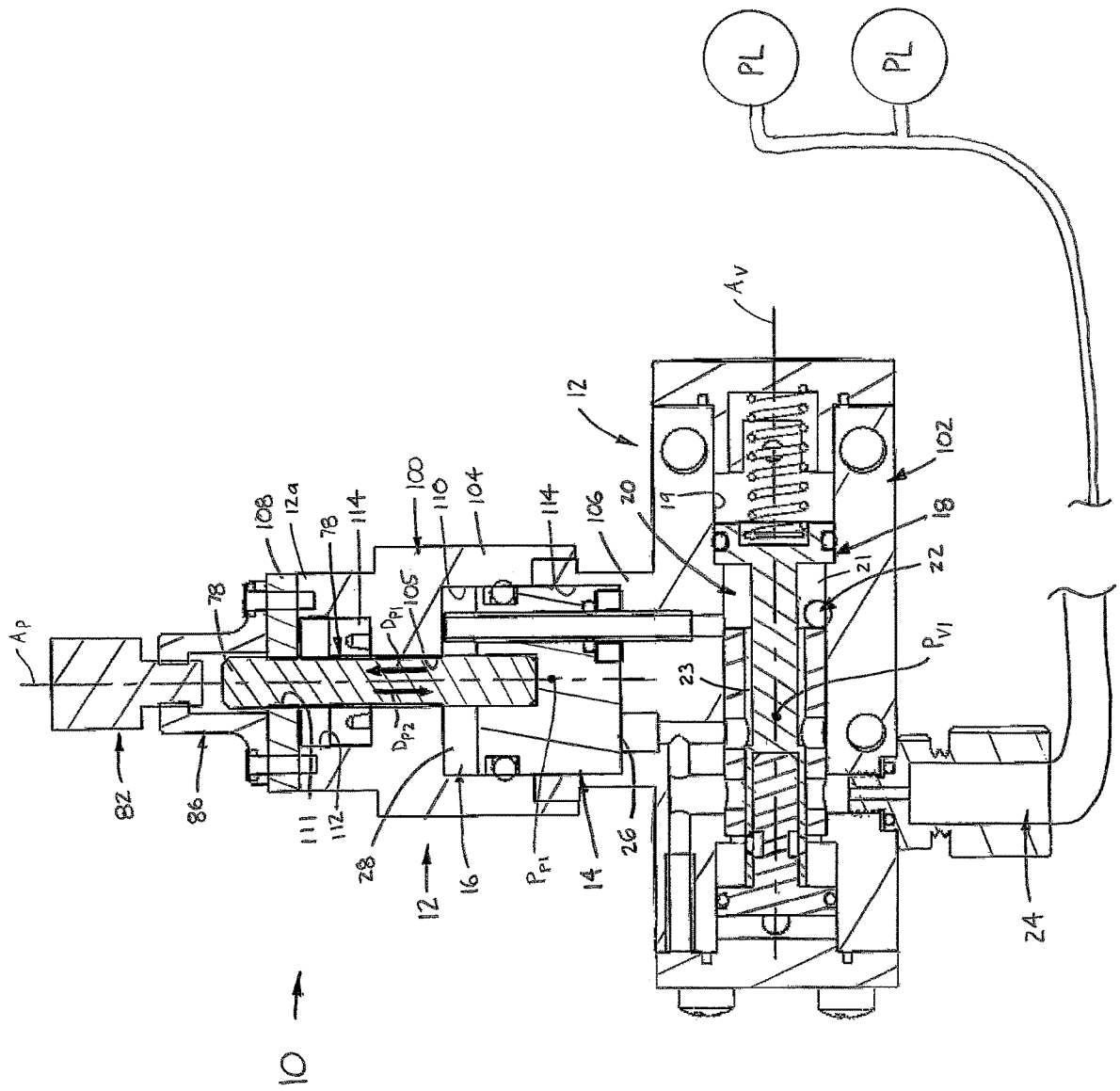
FIG. 1 is an axial cross-sectional view of an injector of the present invention, shown with a piston in a first position and a valve member in a first position.

Certain terminology is used in the following description for convenience only and is not limiting. The words "top", "bottom", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 2:
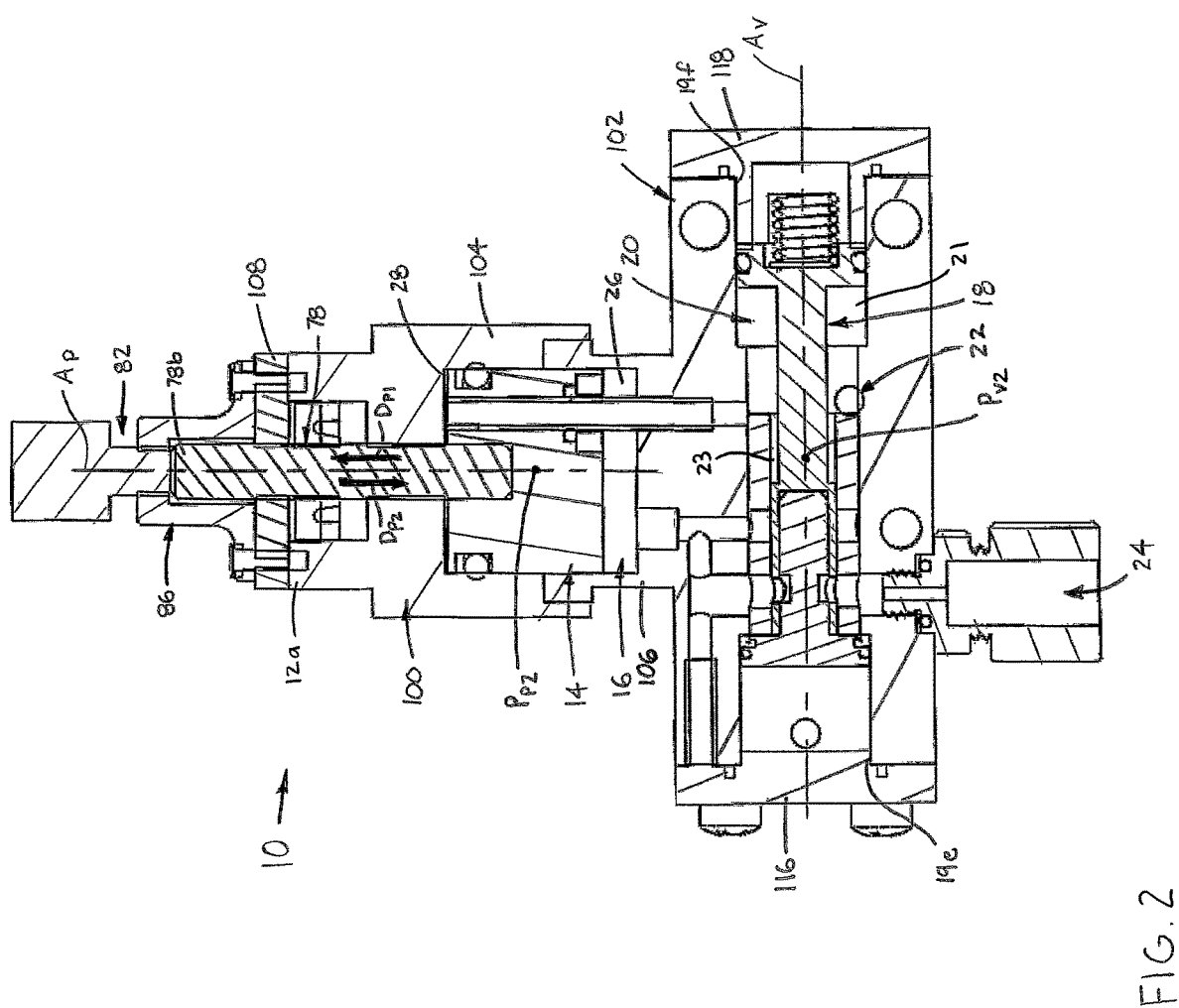
FIG. 2 is another view of the injector of FIG. 1, shown with the piston in a second position and the valve member in a second position.
Figure 8:
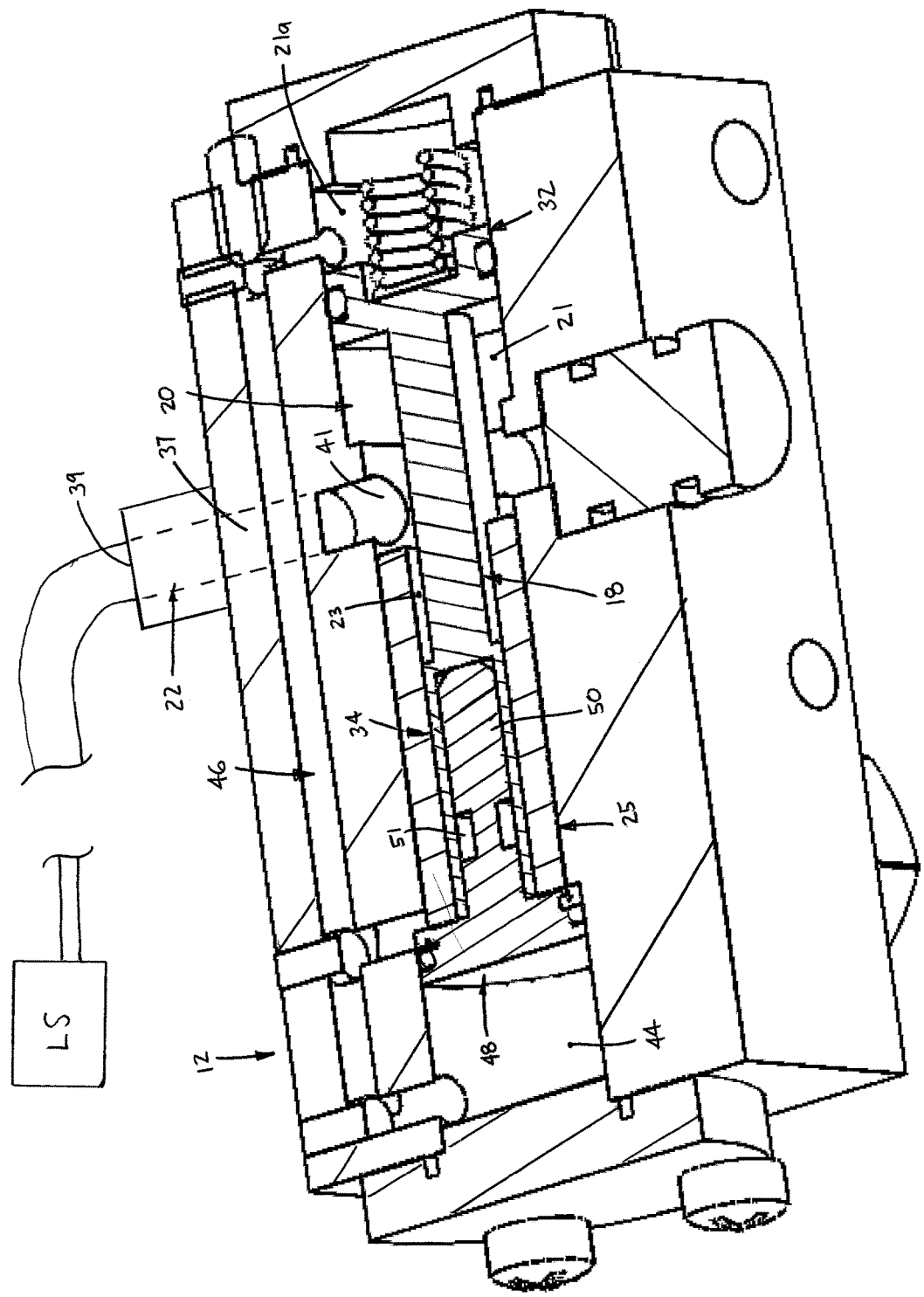
FIG. 8 is an axial cross-sectional view of a lower portion of the injector, showing a recirculation passage.
Figure 9:
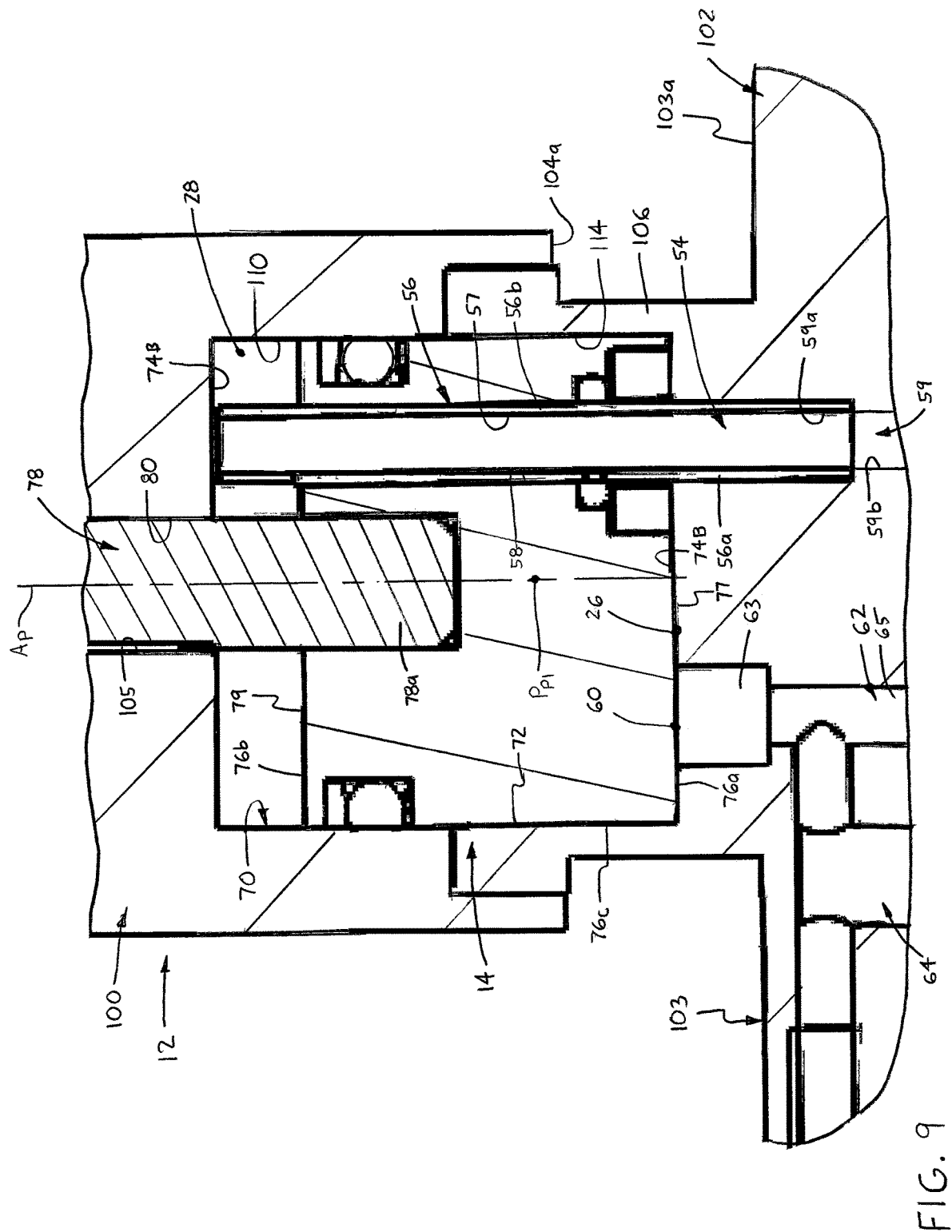
FIG. 9 is a broken-away, enlarged view of a central portion of FIG. 1.
Figure 10:
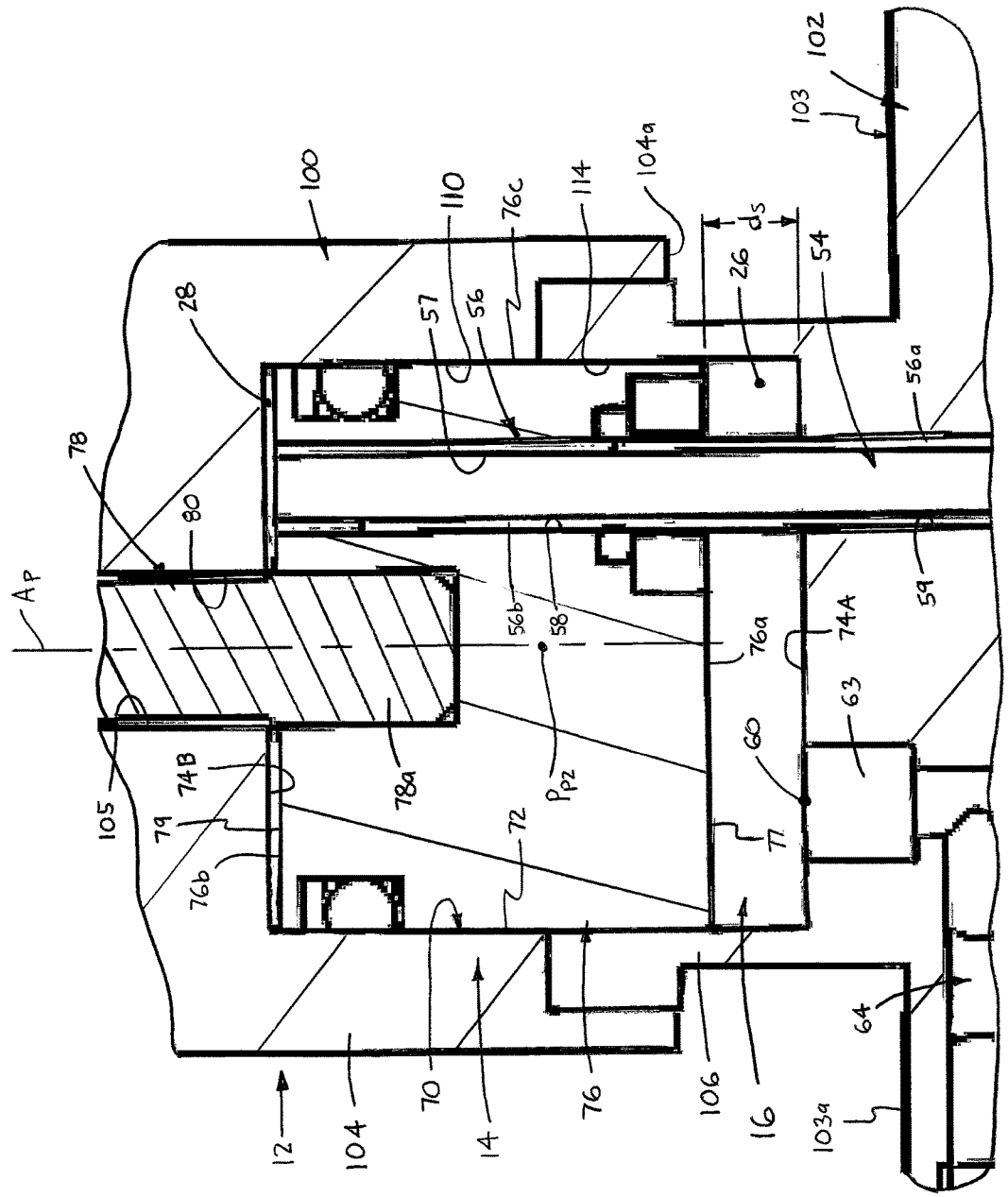
FIG. 10 is a broken-away, enlarged view of a central portion of FIG. 2.

Referring now to the drawings in detail, wherein like numbers are used to indicate like elements throughout, there is shown in FIGS. 1-12 a lubricant injector 10 for providing predetermined quantities of a lubricant, preferably grease but may be a less viscous oil, to one or more lubrication points PL (FIG. 1), such as for example, a bearing, a gear train, a sliding machine part, etc. The injector 10 basically comprises an injector body 12, a piston 14 disposed within a piston chamber 16 of the body 12, and a valve member 18 disposed within a valve chamber 20 of the body 12, the valve chamber 20 being spaced from and fluidly coupled with the piston chamber 16. More specifically, the injector body 12 has an inlet port 22 fluidly coupleable with a lubricant supply LS (FIG. 8), e.g., a grease pump or grease storage container, an outlet port 24 fluidly coupleable with one or more lubrication points PL (FIG. 1), the piston chamber 16 and the valve chamber 20 being fluidly coupled with the inlet port 22 and/or the outlet port 24, as described in detail below. The piston 14 is movably or slidably disposed within the chamber 16 so as to define a measuring section 26 and an actuating section 28. The piston 14 is linearly displaceable along a central axis $A_P$ extending through the piston chamber 16 so as to inversely vary the volume of the chamber measuring section 26 and the volume of the chamber actuating section 28. That is, when the piston 14 displaces in a first, "upward" direction $D_{P1}$ along the central axis $A_P$ from a first, bottommost position $P_{P1}$ (FIGS. 1 and 9), the volume of the chamber measuring section 26 increases by a certain amount and the volume of the chamber actuating section 28 decreases by the same amount until the piston 14 reaches a second, topmost position $P_{P2}$ (FIGS. 2 and 10). Conversely, when the piston 14 displaces in a second, "downward" direction $D_{P2}$ along the axis $A_P$ from the topmost position $P_{P2}$, the volume of the chamber measuring section 26 decreases (thereby forcing lubricant from the chamber section 26) while the volume of the chamber actuating section 28 proportionally increases until the piston 14 returns to the bottommost position $P_{P1}$.

Further, the valve member 18 is movably or slidably disposed within the valve chamber 20 so as to be linearly displaceable along a central axis $A_V$ extending through the valve chamber 20 between first and second positions $P_{V1}$, $P_{V2}$, respectively. In the valve member first position $P_{V1}$, the inlet port 22 is fluidly coupled with both the piston chamber actuating section 28 and with the piston chamber measuring section 26, as shown in FIGS. 1, 3, 12A and 12B. As such, lubricant from the supply LS is capable of flowing through the valve chamber 20 to both piston chamber sections 26, 28. Furthermore, in the valve member second position $P_{V2}$, the inlet port 22 is fluidly coupled with the piston chamber actuating section 26 and the outlet port 24 is fluidly coupled with the piston chamber measuring section 26, as depicted in FIGS. 2, 10, 12C and 12D. Thereafter, lubricant flowing into the actuating chamber section 28 pushes the piston 14 in the second direction $D_{P2}$ (i.e., downwardly) such that the piston 14 displaces a predetermined quantity of lubricant within the piston chamber measuring section 26 to flow through a section of the valve chamber 20 and then through the outlet port 24 to one or more lubrication points PL (FIG. 1), as discussed in further detail below.

Figure 3:
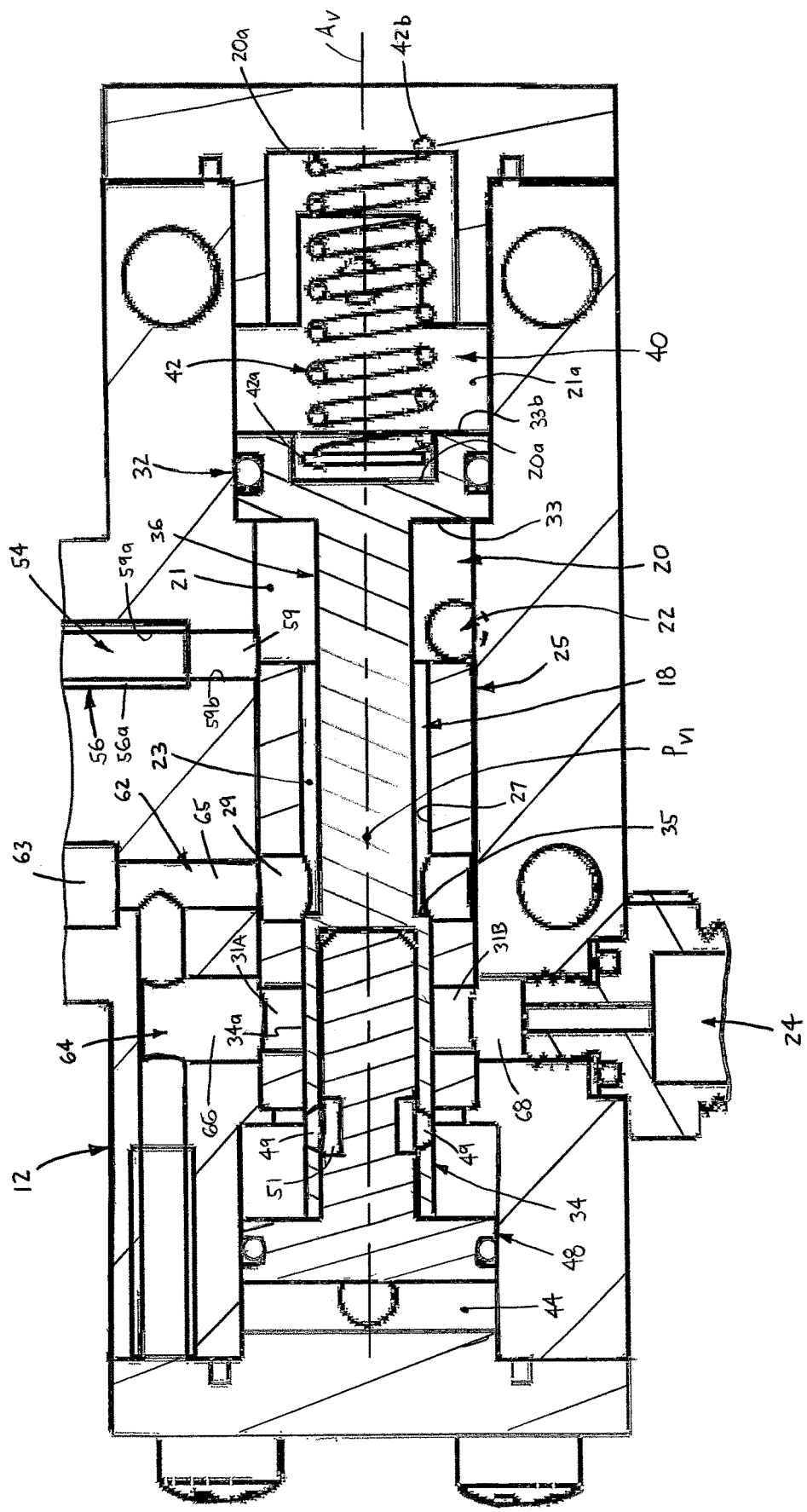
FIG. 3 is a broken-away, enlarged view of a lower portion of FIG. 1.
Figure 4:
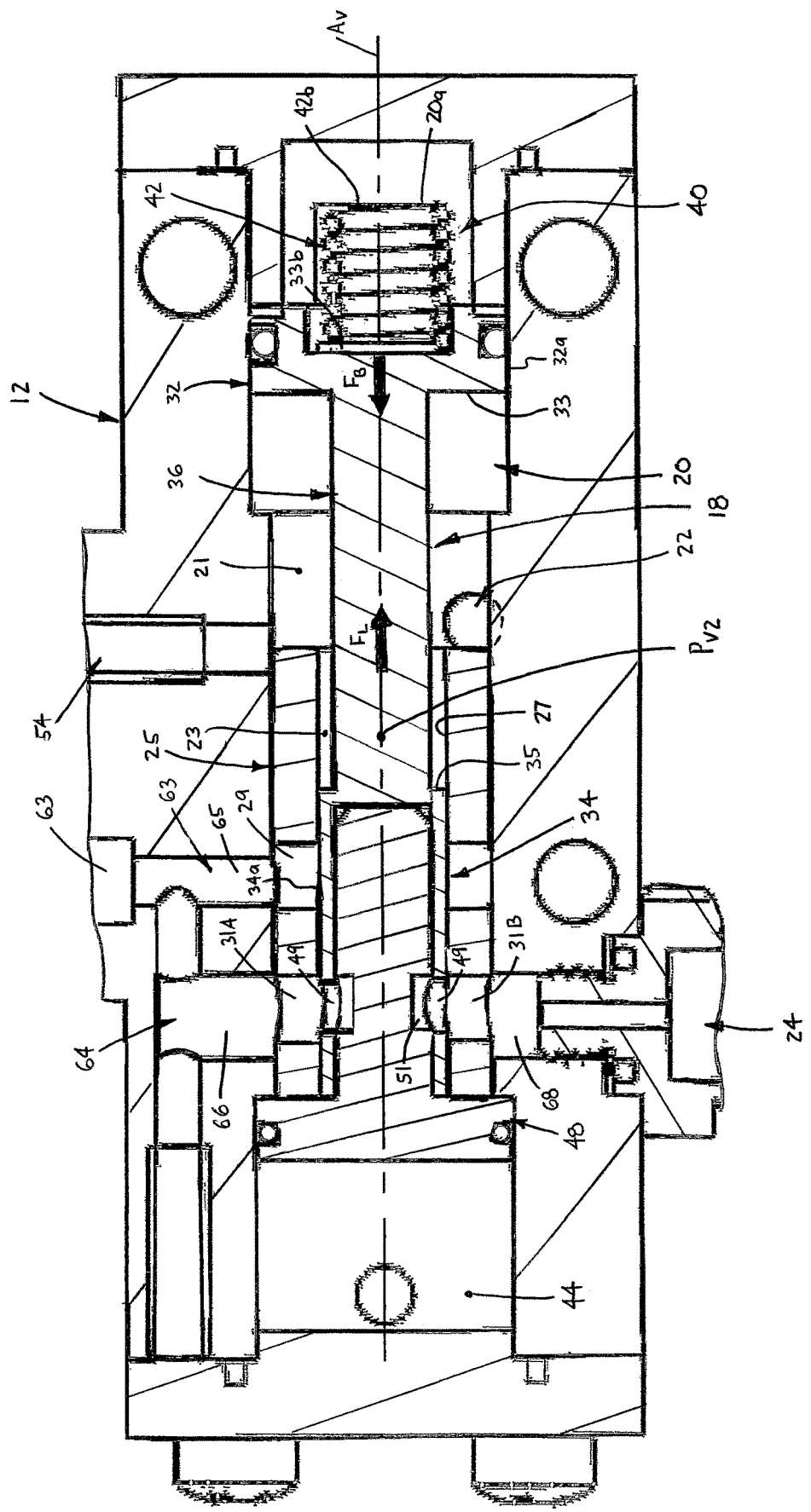
FIG. 4 is a broken-away, enlarged view of a lower portion of FIG. 2.
Figure 5:
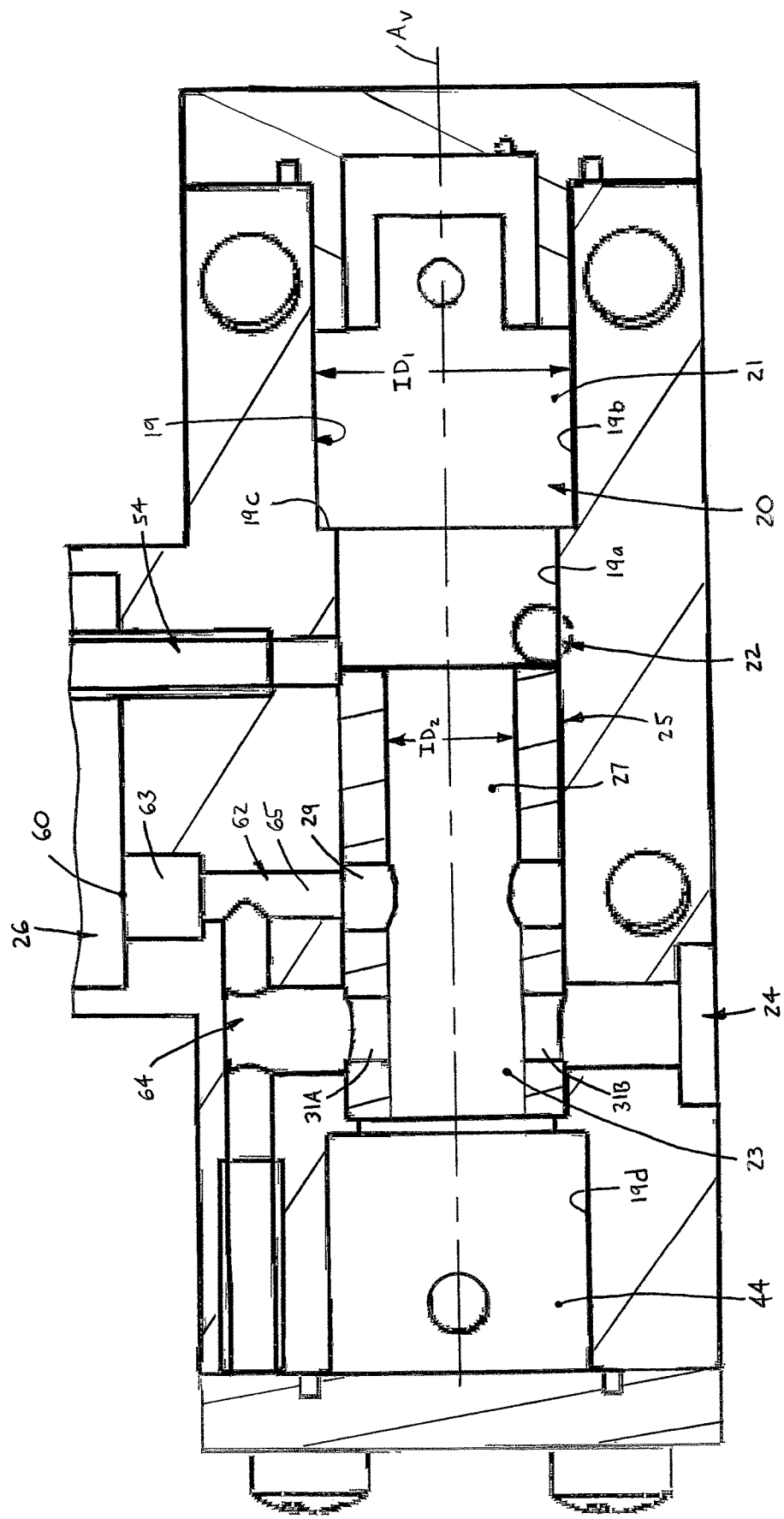
FIG. 5 is a broken-away, enlarged view of the injector, shown without the valve member and biasing member.

Referring now to FIGS. 3-5, the valve chamber 20 is preferably formed having a first section 21 with a first inside diameter $ID_1$ and a second section 23 with a second inside diameter $ID_2$, the two chamber sections 21, 23 being relatively sized such that the first diameter $ID_1$ is greater than the second diameter $ID_2$. Preferably, the valve chamber 20 is provided by a generally circular bore 19 (FIG. 5) extending at least partially through the injector body 12, the bore 19 being sized having at least a section with the first inside diameter $ID_1$, and by the central bore 27 of a generally circular tubular sleeve 25 disposed within the valve chamber bore 19. Most preferably, as indicated in FIG. 5, the bore 19 is stepped and has a central section 19a with an inside diameter (not indicated) having a value between the first and second diameters $ID_1$, $ID_2$, a first counterbore end section 19b with the first inside diameter $ID_1$, such that a radial stop surface 19c is defined between the central and first end sections 19a, 19b, respectively, and a second counterbore end section 19d providing a collection chamber section 44, as described below.

Further, the sleeve 25 is sized having an outside diameter (not indicated) slightly greater than the inside diameter of the bore central section 19a so as to be press fit within the body bore 19 and extends partially along the valve chamber axis $A_V$. The sleeve central bore 27 has an inside diameter equal to the second inside diameter $ID_2$. With this structure, the valve chamber first section 21 is defined by portions of the body bore 19 externally of the sleeve 25 and the valve chamber second section 23 is provided by the sleeve bore 27. Preferably, the sleeve 25 further has at least one first hole 29 extending radially through the sleeve 25 and two second holes 31A, 31B also extending radially through the sleeve 25 and spaced axially from the at least one first hole 29, the holes 29, 31A, 31B providing passaging to and from the piston chamber measuring section 26, as described in detail below.

Referring to FIGS. 3, 4, 6 and 7, the valve member 18 is preferably formed so as to include a first cylindrical head 32 disposed in the valve chamber first section 21, a second cylindrical head 34 disposed within the valve chamber second section 23, most preferably within the sleeve bore 27, and a rod 36 having a first end 36a connected with the first head 32 and an opposing second end 36b connected with the second head 34. The valve heads 32, 34 each have an outer circumferential surface 32a, 34a, respectively, with an outside diameter $OD_1$, $OD_2$, respectively, the first head diameter $OD_1$ being substantially greater than the second head diameter $OD_2$, as best shown in FIG. 6. Each head diameter $OD_1$, $OD_2$, is about equal to, but slightly lesser than, the respective inside diameter $ID_1$, $ID_2$ of the specific chamber section 21, 23 in which the head 32, 34 is located, such that each head 32, 34 is slidably displaceable within the associated valve chamber 21, 23, respectively. Further, the first valve head 32 has a generally annular, inner radial pressure surface 33 with a first surface area and the second valve head 34 has a generally annular, inner radial pressure surface 35 facing the first head pressure surface 33 and having a second surface area. Due to the relative sizing of the valve head outside diameters $OD_1$, $OD_2$, the first surface area of the first pressure surface 33 is substantially greater than the second surface area of the second head pressure surface 35.

Furthermore, the injector inlet port 22 is fluidly coupled with the valve chamber 20 at a location between the first head 32 and the second head 34, and preferably includes an inlet passage 37 extending through the injector body 12 between an inlet opening 39 and a valve chamber inlet port 41, as best shown in FIG. 8. Thus, the fluid pressure of any quantity of lubricant located within the valve chamber 20 between the first head 32 and the second head 34 is exerted on both the first head pressure surface 33 and the second head pressure surface 35. Due to the surface area of the first head pressure surface 33 being substantially greater than the surface area of the second head pressure surface 35, lubricant pressure exerted equally on both pressure surfaces 33, 35 provides a net force $F_L$ (FIG. 4) on the valve member 18 directed along the valve chamber axis $A_V$ and toward the valve member second position $P_{V2}$.

Referring to FIGS. 3, 4 and 8, the lubricant injector 10 preferably further comprises a biasing member 40 configured to bias the valve member 18 toward the first position $P_{V1}$, most preferably including a compression coil spring 42. Specifically, the preferred coil spring 42 is disposed within the valve chamber 20 and has a first end 42a disposed against an end wall 20a of the valve chamber 20 and a second end 42b disposed against an outer radial end surface 33b of the valve first head 32. With such a biasing member 40, the valve member 18 displaces toward the second position $P_{V2}$ only when lubricant pressure in the valve chamber 20 exerts a net force $F_L$ on the valve member 18 with a magnitude greater than the magnitude of a biasing force $F_B$ exerted by the biasing member 40 on the valve member 18, as indicated in FIG. 4.

Thus, the valve member 18 (located in the first position $P_{V1}$) fluidly couples the injector inlet port 22 with both piston chamber sections 26, 28 until lubricant pressure within the valve chamber 20 increases to the point that the net force $F_L$ on the valve member 18 exceeds the biasing force $F_B$, after which the member 18 displaces to the second position $P_{V2}$. In the second position $P_{V2}$, the inlet port 22 is coupled only with the piston chamber actuating section 28 and the outlet port 24 is fluidly coupled with the piston chamber measuring section 26, as discussed above and in further detail below.

Still referring to FIGS. 3, 4 and 8, to prevent "hydraulic locking" of the valve member 18, the injector 10 is preferably provided with means to recirculate lubricant leaking past the valve member heads 32, 34, particularly the valve member second head 34. Specifically, the valve chamber 20 preferably further has a third, collection section 44 fluidly coupled with the chamber second section 23 such that the chamber second section 23 is located between the chamber first section 21 and the chamber collection section 44. Also, the injector body 12 preferably further has a recirculation passage 46 extending between the valve chamber collection section 44 and a collection portion 21a of the valve chamber first section 21 defined between the first piston head 32 and a radial end surface 47 of the valve chamber 20. Further, the valve member 18 further includes a third cylindrical head 48 disposed within the valve chamber collection section 44 and coupled with the second valve head 34, preferably by means of an integral stub shaft 50 extending from the head 48 and disposed within a circular bore 52 extending into the second head 34. When the valve member 18 includes the preferred third head 48, the valve second head 34 preferably includes two flow ports 49, which are alignable with the valve sleeve second openings 31 when the valve member 18 is at the second position $P_{V2}$, and the stub shaft 50 has an annular groove 51 fluidly coupled with the ports 49. As such, lubricant flows through the ports 49 and about the groove 51 when passing between the piston measuring chamber section 26 and the injector outlet 24, as described in further detail below.

With the above structure, the valve third head 48 pushes leakage lubricant located within the chamber collection section 44 into the recirculation passage 46 when the valve member 18 displaces toward the valve member first position $P_{V1}$, so as to thereby flow into the collection portion 21a of the first chamber section 21. Alternatively, the valve first head 32 pushes leakage lubricant into the recirculation passage 46 and into the collection chamber section 44 when the valve member 18 displaces toward the valve second position $P_{V2}$. Thus, any lubricant leaking past either one of the main valve heads 32, 34 is pushed to flow back and forth between the collection chamber section 44 and the collection portion 21a of the first chamber section 21 during displacement of the valve member 18, as otherwise lubricant leaked beyond the outer surfaces of the first and second heads 32, 34 may prevent displacement of the valve member 18.

Referring now to FIGS. 3-5, 9 and 10, the injector body 12 preferably includes an actuation passage 54 extending between the valve chamber 20 and the piston chamber actuating section 28 to fluidly couple the inlet port 22 with the chamber section 28. Most preferably, at least a portion of the actuation passage 54 is provided by a generally circular tube 56 extending into the piston chamber 16 and disposed within a hole 58 through the piston 14, such that the piston 14 slides about the tube 56 when displacing within the piston chamber 16. More specifically, the injector body 12 has a hole 59 extending between the valve chamber 20 and the piston chamber 16 and the tube 56 has a lower portion 56a disposed within at least a section 59a of the body hole 59 and an upper portion 56b disposed within the piston chamber 16. As such, the actuation passage 54 is provided by the longitudinal bore 57 of the tube 56 and a section 59b of the body hole 59.

Further, the measuring chamber section 26 of the piston chamber 16 has a port 60 and the injector body 12 further has two passages 62, 64 each coupled with the measuring chamber port 60. That is, a fill passage 62 extends between the valve chamber 20 and the measuring chamber port 60 and a discharge passage 64 extends between the measuring chamber port 60 and the injector body outlet port 24, the two passages 62, 64 being partially coincident so as to have a common section 63 extending into and from the chamber port 60. More specifically, the fill passage 62 further includes a hole 65 in the injector body 12 extending between and fluidly coupling the passage common section 63 and the at least one first hole 29 of the valve chamber sleeve 25. Further, the discharge passage 64 further includes an inner hole 66 extending between the passage common section 63 and an innermost second hole 31A of the valve chamber sleeve 25 and an outer hole 68 extending between the outlet port 24 and the outermost second hole 31B of the valve sleeve 25.

Figure 12A:
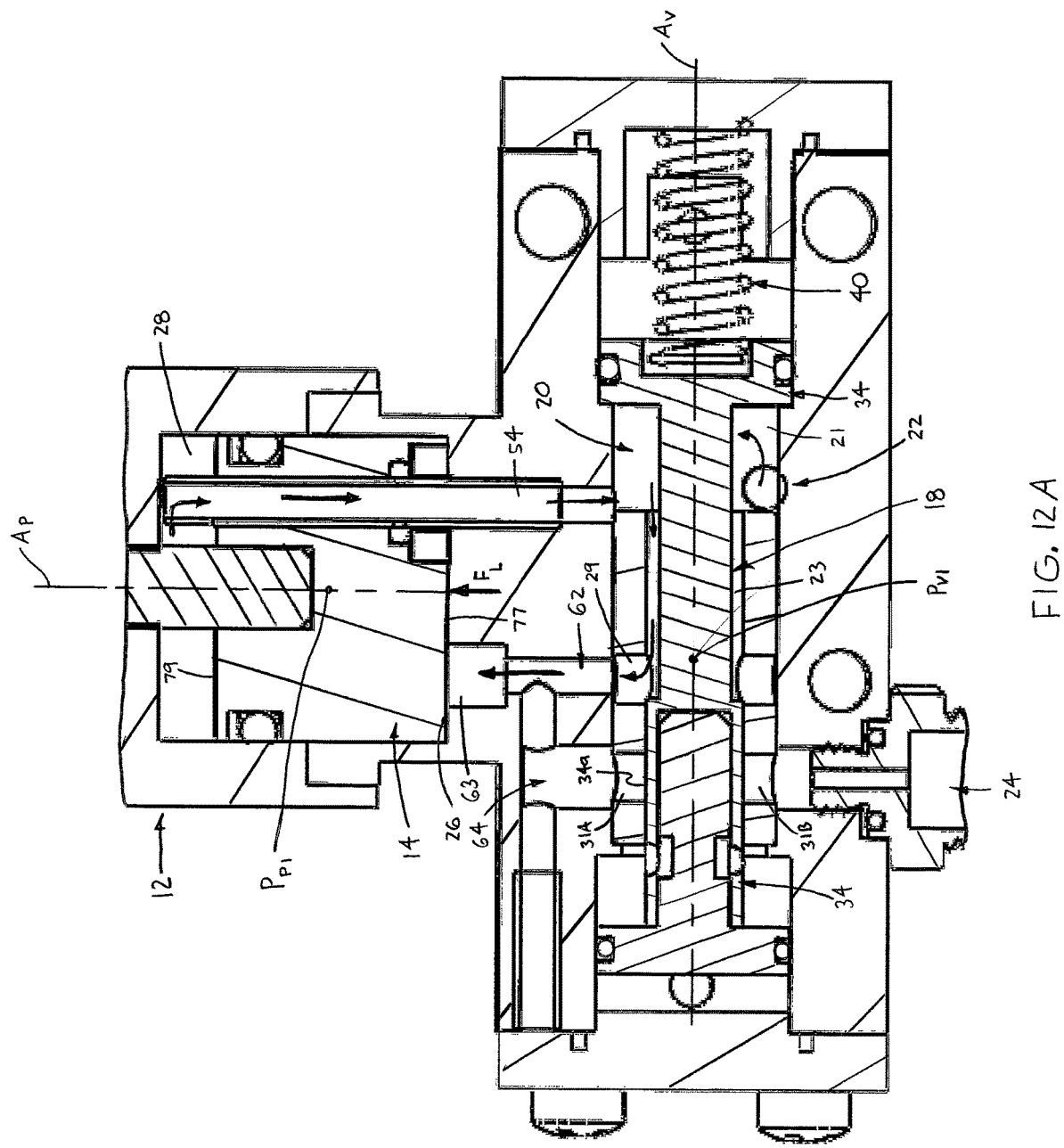
FIGS. 12A-12D, collectively
Figure 12B:
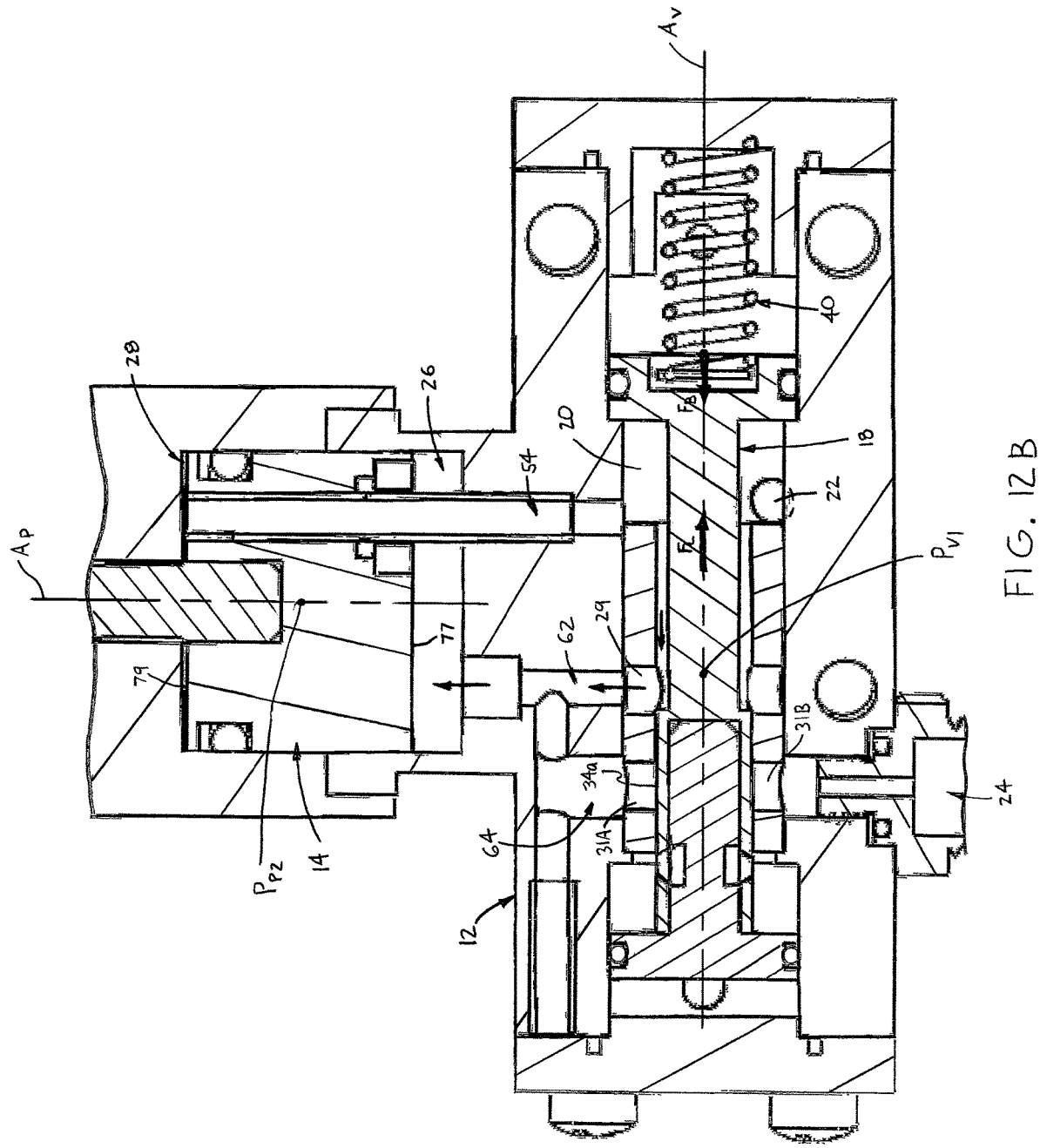
Figure 12C:
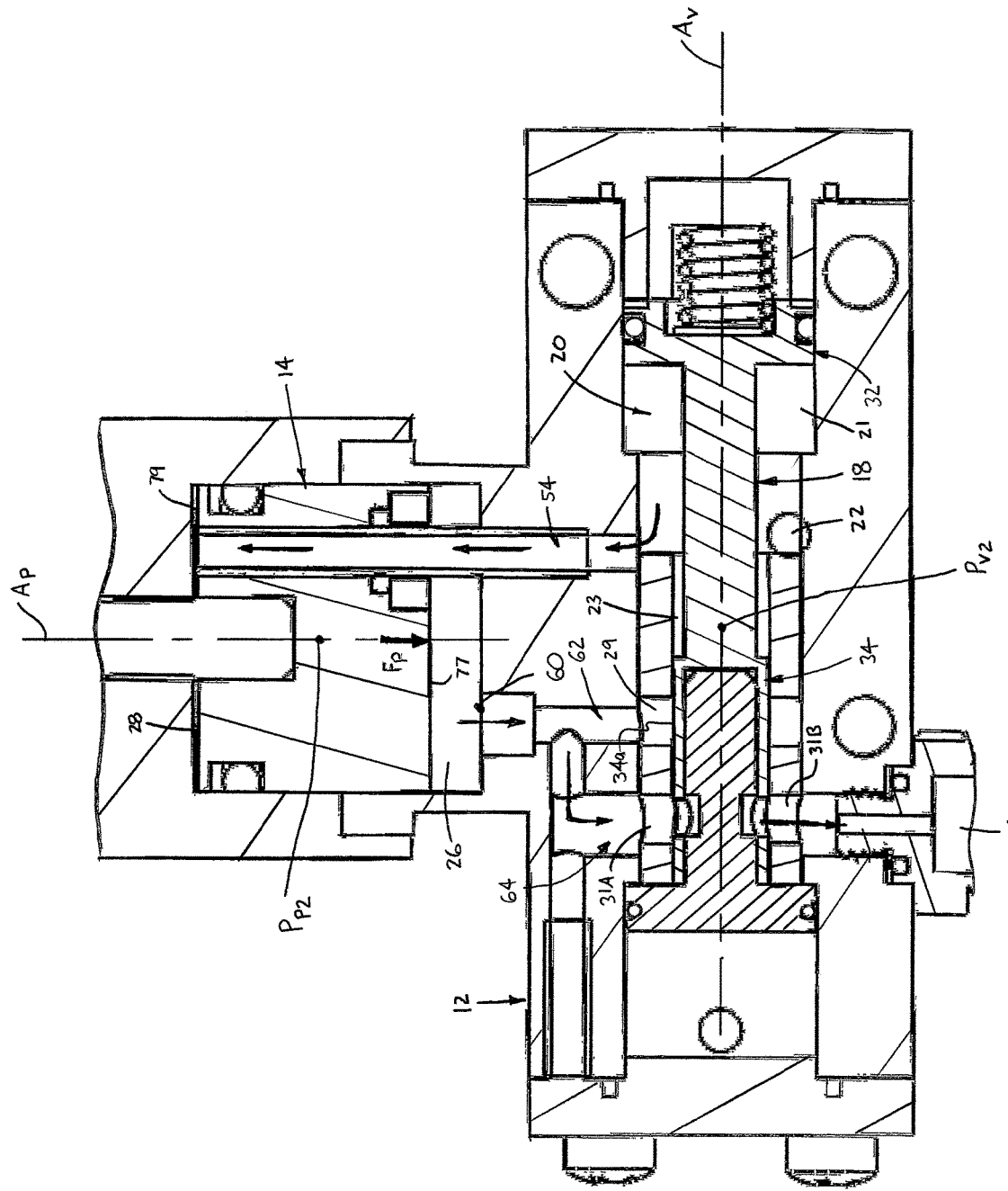

As such, lubricant flows out of the piston chamber measuring section 26 through the measuring section port 60 and the passage common section 63, through the discharge passage inner hole 66 and the innermost sleeve second hole 31A, into one head port 49, around the groove 51 and out the other head port 49, through the discharge passage outer hole 68 and then through the outlet port 24, as indicated by arrows in FIG. 12C.

Thus, with the above passage structures, the fill passage 62 fluidly couples the piston measuring chamber section 26 and the valve chamber 20 when the valve member 18 is at the first position $P_{V1}$, while the outer surface 34a of the valve second head 34 obstructs the chamber sleeve innermost hole 31A to prevent flow to the outlet port 24 through the discharge passage 64. When the valve member 18 is at the second position $P_{V2}$, the outer surface 34a of the valve member second head 34 now obstructs or seals the sleeve first hole 29, preventing flow between the inlet 22 and the measuring chamber section 26, while the discharge passage 64 fluidly couples the piston measuring chamber section 26 and the outlet port 24, as discussed in further detail below.

Figure 11:
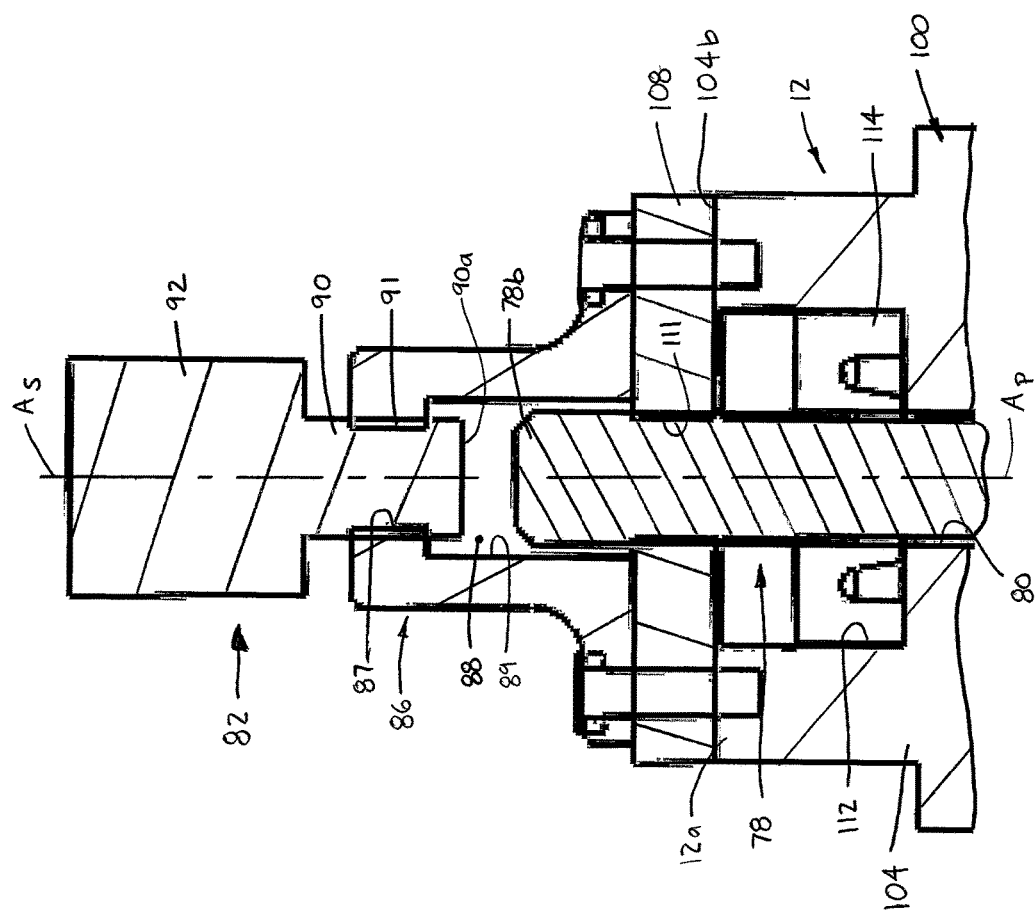
FIG. 11 is a broken-away, enlarged view of an upper portion of FIG. 1.

Referring now to FIGS. 9-11, the piston chamber 16 is provided by a generally cylindrical bore 70 extending into the injector body 12 and bounded by an inner circumferential surface 72 and two facing, generally circular end surfaces 74A, 74B. The piston 14 is disposed within the body bore 70 and preferably includes a circular cylindrical head 76 with a first, lower axial end 76a, an opposing second, upper axial end 76b and a rod 78 extending from the second end 76b and along the piston chamber axis $A_P$. The piston cylindrical head 76 includes the above-described through hole 58 extending between the axial ends 76a, 76b for the actuation passage 54 and further has an outer circumferential surface 76c with an outside diameter (not indicated) sized slightly lesser than an inside diameter (not indicated) of the bore inner surface 72 such that the piston 14 is slidably displaceable within the bore 70.

Further, the piston first axial end 76a has a radial pressure surface 77 and partially bounds the piston chamber measuring section 26, which is also bound by the end surface 74 and a varying portion of the bore inner circumferential surface 72. The piston second axial end 76b has an annular pressure surface 79 (i.e., defined about the interface with the rod 78) and partially bounds the piston chamber actuating section 28, along with the bore inner surface 72 and the second radial end surface 74B. Further, the rod 78 is preferably circular cylindrical and has an inner end 78a connected with the piston head 76 and an opposing free end 78b spaced axially from the head second axial end 76b and extending through a secondary bore 80 of the injector housing 12, which is generally collinear with and connected with the bore 70.

Due to the radial pressure surface 77 having a substantially greater surface area than the surface area of the annular pressure surface 79, equal lubricant pressure on both piston axial ends 76a, 76b biases the piston 14 in the first, upward direction $D_{P1}$ along the piston chamber axis $A_P$. As such, the piston 14 only displaces in the second, downward direction $D_{P2}$ when a differential between the lubricant pressure in the actuating chamber 28 and the lubricant pressure in the measuring chamber 26 is of sufficient magnitude such that the ratio of the actuating chamber pressure "$PL_A$" to the measuring chamber pressure "$PL_A$" is greater than the ratio of the surface area "$SA_R$" of the radial pressure surface 77 to the surface area "$SA_A$" of the annular pressure surface 79; that is, when $PL_A/PL_M > SA_R/SA_A$.

Referring now to FIGS. 1, 2 and 11, to provide the capability of varying the volume of lubricant delivered to one or more lubrication points, the injector 10 preferably includes means to vary the maximum volume of the piston measuring chamber section 26. Specifically, the injector 10 preferably further comprises a stop member 82 coupled with the injector body 12 so as to be adjustably positionable along the piston chamber central axis $A_P$. The stop member 82 is contactable by the piston rod free end 78b to limit displacement of the piston 14 in the first direction $D_{P1}$ along the piston chamber axis $A_P$, which establishes the maximum or "full" volume of the measuring chamber section 26 and thus the specific volume of lubricant delivered by the injector 10. Preferably, the injector 10 further comprises a collar 86 coupled with an upper end 12a of the injector body 12 and having a central bore 88. The stop member 82 is preferably adjustably coupled with the collar 86 such that a portion of the stop member 82 is disposed within the collar bore 88 and displaceable along an axis $A_S$ collinear with the piston chamber axis $A_P$. Most preferably, the stop member 82 includes a shaft 90 with exterior threads 91 and a knob 92 for manually rotating the shaft 90, and the collar 86 includes interior threads 87 on the inner circumferential surface 89 defining the collar bore 88, as indicated in FIG. 11.

As such, rotation of the knob 92 in one angular direction advances the shaft 90 within the collar bore 88 and, alternatively, rotation in an opposing angular direction withdraws the shaft 90 from the collar 88, which in either case adjusts the position of a free end 90a of the shaft 90 within the collar bore 88. The piston rod free end 78b is disposeable within the collar bore 88 and is contactable with the shaft end 90a to prevent further displacement of the piston 14 in the first direction $D_{P1}$ along the piston chamber axis $A_P$, and thus defines the specific location of the piston second position $P_{P2}$ (FIGS. 2 and 10). As such, the spacing distance ds (FIG. 10) of the piston first axial end 76a from the chamber inner radial end surface 74A is variable from about zero to a maximum spacing distance at which the piston second axial end 76b contacts the piston chamber outer radial surface 74B, which correspondingly varies the maximum volume of the measuring chamber section 26 from about zero to a maximum value.

Referring now to FIGS. 1, 2 and 9-11, the injector body 12 is preferably formed of a first body section 100 having the bore 70 providing the piston chamber 16 and a second body section 102 connected with the upper body section 100 and having the bore 19 providing the valve chamber 20. The first body section 100 includes an upper cylindrical portion 104, a lower circular collar portion 106 and an upper end plate 108. The upper cylindrical portion 104 has opposing axial ends 104a, 104b, a central bore 105 and two counterbore openings 110, 112 each extending inwardly from a separate axial end 104a, 104b, respectively. The lower counterbore opening 110 provides the upper end of the piston chamber 16 and the upper counterbore opening 112 provides space for an annular seal 114 for sealing about the piston rod 78, which extends through the central bore 105. Further, the end plate 108 is generally circular and has a central opening 111 for receiving the piston rod 78 and is attached to the axial end 104b of the cylindrical body portion 104 so as to generally enclose the upper counterbore opening 112. Also, the lower collar portion 106 has a central bore 114 providing the lower end of the piston chamber 16 and is preferably integrally formed with the injector body second section 102.

Furthermore, the second body section 102 is preferably generally rectangular and has an exterior surface 103, the injector inlet port 22 and the injector outlet port 24 each extending inwardly from the exterior surface 103, and includes two circular end plates 116, 118 each enclosing a separate end 19a, 19b, respectively, of the valve chamber bore 19. The exterior surface 103 of the second body section 102 includes an upper surface section 103a and the first body section 100 preferably extends upwardly from the upper surface section 103a, most preferably the integral collar portion 106 of the first body section 100 projects vertically outwardly from the surface 103a. Further, the injector body 12 is preferably formed with the first and second body sections 100, 102 being arranged such that the piston chamber axis $A_P$ is generally perpendicular or skewed with respect to the valve chamber axis $A_V$. Although preferably formed as described above, the injector body 12 may be formed in any appropriate manner that is capable of housing or/and supporting the basic components (e.g., piston 14, valve member 18) and structural features (e.g., piston chamber 16, valve chamber 20, passages 54, 62, 64, etc.) of the injector 10. For example, the injector body 12 may be formed as a single solid block or as a plurality of connected walls and/or blocks, etc. (no alternatives shown).

Referring to FIGS. 12A-12D, the lubricant injector 10 of the present invention operates generally as follows. Prior to use in a particular application, the stop member 82 is set to a position at which the piston measuring chamber section 26 will receive a desired quantity of lubricant from the inlet port 22, and thereafter deliver that lubricant quantity through the outlet port 24 to the application point(s) PL. Once adjusted, the operation cycle of the injector 10 starts at an initial disposition shown in FIG. 12A, at which the piston 14 is the first, bottommost piston position $P_{P1}$ and the valve member 18 is at the first valve position $P_{V1}$. In this arrangement, the injector inlet port 22 is fluidly coupled with both the piston measuring chamber section 26 and the piston actuating chamber section 28. Lubricant flows from the inlet port 22 and into the valve chamber 20, then passes through both the fill passage 62 into the measuring chamber section 26, and also flows out of the actuating chamber section 28 through the actuation passage 54 and back into the valve chamber 20. Due to the surface area differences between the piston pressure surfaces 77 and 79, lubricant pressure generates a net upward force $F_L$ on the piston 14, such that the piston 14 moves upwardly in the first direction $D_{P1}$ toward the topmost, second position $P_{P2}$, filling the measuring chamber section 26 with the desired quantity of lubricant, with the components of the injector 10 being arranged as shown in FIG. 12B.

At this point, no further lubricant can enter the measuring chamber section 26, such that lubricant pressure increases within the valve chamber 20 until reaching the predetermined magnitude to generate a net force $F_L$ on the valve member 18 sufficient to overcome the force $F_B$ of the biasing member 40, as indicated in FIG. 12B. As the valve member 18 displaces from the first position $P_{V1}$ toward the second position $P_{V2}$, the fill passage 62 closes while the outlet passage opens 64, allowing the quantity of lubricant in the measuring chamber section 26 to flow through the outlet passage 64 and out of the outlet port 24, and thereafter to the desired application point(s), as indicated by arrows in FIG. 12C. As the lubricant evacuates the measuring chamber section 26, lubricant pressure on the piston first pressure surface 77 decreases while the pressure on the piston second pressure surface 79 increases, resulting in a net downward force $F_P$ on the piston 14 so that the piston 14 pushes lubricant out of the measuring chamber port 60 while lubricant enters the actuating chamber 28 through the actuation passage 54, as depicted in FIG. 12C.

Figure 12D:
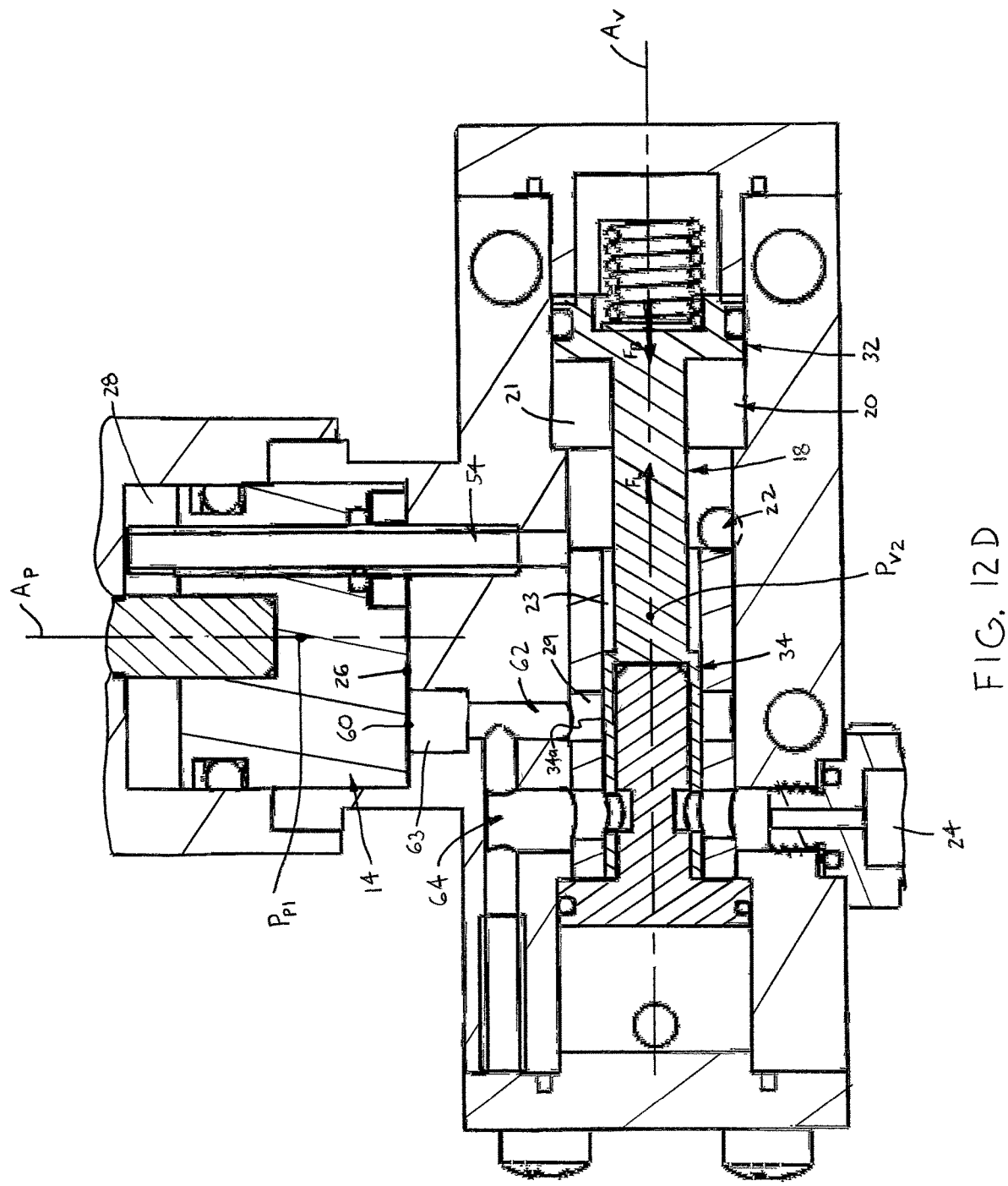

As lubricant from the valve chamber 20 flows into the actuating chamber section 28, pressure within the valve chamber 20 decreases until the force $F_B$ of the biasing member 40 is greater than the net force of lubricant pressure $F_L$ on the valve member 18, as indicated in FIG. 12D, such that the member 18 displaces from the second position $P_{V2}$ back to the first position $P_{V1}$ by action of the biasing member 40. When the piston 14 returns to the piston first position $P_{P1}$ and the valve member 18 is at the valve first position $P_{V1}$, as depicted in FIG. 12A, further lubricant flow into the actuating chamber section 28 is prevented, such that lubricant flowing into the valve chamber 20 is directed again through the fill passage 62 and into the measuring chamber section 26 so that chamber section 26 again fills with the predetermined quantity of lubricant and the injector 10 repeats the operating cycle as described above.

Due to the structure and manner of operation of the injector 10 as described above, the injector 10 is capable of very fast venting and reloading and may be sized relatively small in comparison to previously known injectors in order to deliver relatively small quantities of lubricant. The injector 10 is particularly suited to deliver "heavy" lubricants such as heavy oil or grease in a rapid and reliable manner, but may be used for any other type of lubricant and/or sized for any desired application.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A lubricant injector comprising:

an injector body having an inlet port fluidly coupleable with a lubricant supply, an outlet port fluidly coupleable with a lubrication point, a piston chamber and a valve chamber;

a piston disposed within the piston chamber so as to define a measuring section and an actuating section, the piston being linearly displaceable along an axis extending through the piston chamber so as to inversely vary the volume of the chamber measuring section and the volume of the chamber actuating section; and a valve member disposed within the valve chamber and linearly displaceable along an axis extending through the valve chamber between a first position at which the inlet port is fluidly coupled with the piston chamber actuating section and with the piston chamber measuring section and a second position at which the inlet port is fluidly coupled with the piston chamber actuating section and the outlet port is fluidly coupled with the piston chamber measuring section.

2. The lubricant injector as recited in claim 1 wherein:

the valve chamber has first section with a first diameter and a second section with a second diameter, the first diameter being greater than the second diameter; and the valve member includes a first cylindrical head disposed in the valve chamber first section and having an inner radial pressure surface, a second cylindrical head disposed within the valve chamber second section and having an inner radial pressure surface facing the first head pressure surface, and a rod having a first end connected with the first head and an opposing second end connected with the second head, the first head having a diameter greater than a diameter of the second head and the injector inlet being fluidly coupled with the valve chamber at a location between the first head and the second head such that fluid pressure of lubricant within the valve chamber between the first head and the second head is exerted on both the first head pressure surface and the second head pressure surface.

3. The lubricant injector as recited in claim 2 further comprising a biasing member configured to bias the valve member toward the first position such that the valve member displaces toward the second position only when lubricant pressure in the valve chamber exerts a net force on the valve member having a magnitude greater than the magnitude of a biasing force exerted by the biasing member on the valve member.

4. The lubricant injector as recited in claim 3 wherein the first head pressure surface is generally annular and has a first surface area, the second head pressure surface is generally annular and has a second surface area, and the first surface area is substantially greater than the second surface area such that lubricant pressure exerted on the first pressure surface and on the second pressure surface provides a net force on the valve member directed along the axis and toward the valve member second position.

5. The lubricant injector as recited in claim 3 wherein the biasing member includes a compression coil spring disposed within the valve chamber and having a first end disposed against an end wall of the valve chamber and a second end disposed against the first head of the valve member.

6. The lubricant injector as recited in claim 2 wherein:
the valve chamber further has a third, collection section fluidly coupled with the chamber second section such that the chamber second section is located between the chamber first section and the chamber collection section;
the injector body has a recirculation passage extending between the valve chamber collection section and a portion of the valve chamber first section defined between the first piston head and a radial end surface of the valve chamber; and
the valve member further includes a third head disposed within the valve chamber collection section and coupled with the second valve head such that the third head pushes lubricant within the chamber collection section into the recirculation passage when the valve member displaces toward the second position and the first valve head pushes lubricant into the recirculation passage when the valve member displaces toward the first position.

7. The lubricant injector as recited in claim 1 wherein the body includes an actuation passage extending between the valve chamber and the piston chamber actuating section, at least a portion of the actuation passage being provided by a tube extending into the piston chamber and disposed within a hole through the piston such that the piston slides about the tube when displacing within the piston chamber.

8. The lubricant injector as recited in claim 1 wherein the measuring section of the piston chamber has a port, the injector body has a fill passage extending between the valve chamber and the measuring chamber section port and a discharge passage extending between the measuring chamber section port and the outlet port, the discharge passage extending through the valve chamber, the fill passage fluidly coupling the measuring chamber section and the valve chamber when the valve member is at the first position and the discharge passage fluidly coupling the measuring chamber section and the outlet port when the valve member is at the second position.

9. The lubricant injector as recited in claim 8 further comprising a tubular sleeve disposed within the valve chamber, the sleeve having a central bore, at least one first hole extending radially through the sleeve and disposed within the fill passage and two second holes extending radially through the sleeve, spaced axially from the at least one first hole and disposed within the discharge passage such that lubricant flows out of the piston chamber measuring section through the measuring section port, through one of the two second holes and into the sleeve bore, out of the other one of the two second holes and then through the outlet port.

10. The lubricant injector as recited in claim 9 wherein:
the sleeve extends partially along the valve chamber axis, the valve chamber first section is defined externally of the sleeve, and the valve chamber second section is defined by the sleeve bore; and
the valve member includes a first cylindrical head disposed in the valve chamber first section, a second cylindrical head disposed within the sleeve bore and a rod extending between and connecting the first and second heads, the first head having a diameter greater than a diameter of the second head and the injector inlet being fluidly coupled with the valve chamber at a location externally of the sleeve and between the valve member first and second heads.

11. The lubricant injector as recited in claim 1 wherein;
the piston includes a cylindrical head with opposing axial ends, the first axial end partially bounding the piston chamber measuring section and the second axial end partially bounding the piston chamber actuating section, and a rod extending along the piston chamber axis and having an inner end connected with the head and an opposing free end spaced axially from the head second axial end; and
the injector further comprises a stop member coupled with the injector body so as to be adjustably positionable along the piston chamber axis, the stop member being contactable by the rod free end to limit displacement of the piston in a first direction along the piston chamber axis.

12. The lubricant injector as recited in claim 11 further comprising a collar coupled with the injector body and having a central bore, the stop member being adjustably coupled with the collar such that a portion of the stop member is disposed within the collar bore, the rod free end being disposeable within the collar bore.

13. The lubricant injector as recited in claim 1 wherein the injector body includes:
a first body section having a central cavity providing the piston chamber; and
a second body section connected with the first body section and having an exterior surface and a central cavity providing the valve chamber, the injector inlet port and the injector outlet port each extending inwardly from the exterior surface of the second body section.

14. The lubricant injector as recited in claim 13 wherein the exterior surface of the second body section includes an upper surface section, the first body section extends upwardly from the upper surface section of the second body section, and the first and second body sections are arranged such that the piston chamber axis is generally perpendicular or skewed with respect to the valve chamber axis.

15. A lubricant injector comprising:
an injector body having an inlet port fluidly coupleable with a lubricant supply, an outlet port fluidly coupleable with a lubrication point, a piston chamber and a valve chamber, the valve chamber having a first section with a first diameter and a second section with a second diameter, the first diameter being greater than the second diameter;
a piston disposed within the piston chamber so as to define a measuring section and an actuating section, the piston being linearly displaceable along an axis extending through the piston chamber so as to inversely vary the volume of the chamber measuring section and the volume of the chamber actuating section; and
a valve member disposed within the valve chamber and linearly displaceable along an axis extending through the valve chamber between a first position at which the inlet port is fluidly coupled with the piston chamber actuating section and with the piston chamber measuring section and a second position at which the inlet port is fluidly coupled with the piston chamber actuating section and the outlet port is fluidly coupled with the piston chamber measuring section;
wherein the valve member includes a first cylindrical head disposed in the valve chamber first section and having an inner radial pressure surface, a second cylindrical head disposed within the valve chamber second section and having an inner radial pressure surface facing the first head pressure surface, and a rod having a first end connected with the first head and an opposing second end connected with the second head, the first head having a diameter greater than a diameter of the second head and the injector inlet being fluidly coupled with the valve chamber at a location between the first head and the second head such that fluid pressure of lubricant within the valve chamber between the first head and the second head is exerted on both the first head pressure surface and the second head pressure surface.

16. The lubricant injector as recited in claim 15 wherein the body includes an actuation passage extending between the valve chamber and the piston chamber actuating section, at least a portion of the actuation passage being provided by a tube extending into the piston chamber and disposed within a hole through the piston such that the piston slides about the tube when displacing within the piston chamber.

17. The lubricant injector as recited in claim 15 wherein the piston measuring chamber section of the piston chamber has a port, the injector body has a fill passage extending between the valve chamber and the measuring chamber section port and a discharge passage extending between the measuring chamber section port and the outlet port, the discharge passage extending through the valve chamber, the fill passage fluidly coupling the measuring chamber section and the valve chamber when the valve member is at the first position and the discharge passage fluidly coupling the measuring chamber section and the outlet port when the valve member is at the second position.

18. A lubricant injector comprising:
an injector body having an inlet port fluidly coupleable with a lubricant supply, an outlet port fluidly coupleable with a lubrication point, a piston chamber and a valve chamber;
a piston disposed within the piston chamber so as to define a measuring section and an actuating section, the piston being linearly displaceable along an axis extending through the piston chamber so as to inversely vary the volume of the chamber measuring section and the volume of the chamber actuating section; and
a valve member disposed within the valve chamber and linearly displaceable along an axis extending through the valve chamber between a first position at which the inlet port is fluidly coupled with the piston chamber actuating section and with the piston chamber measuring section and a second position at which the inlet port is fluidly coupled with the piston chamber actuating section and the outlet port is fluidly coupled with the piston chamber measuring section;
wherein the injector body includes an actuation passage extending between the valve chamber and the piston chamber actuating section, at least a portion of the actuation passage being provided by a tube extending into the piston chamber and partially disposed within a hole through the piston such that the piston slides about the tube when displacing within the piston chamber.

* * * * *